US011223926B2

(12) United States Patent
Jenkins et al.

(10) Patent No.: US 11,223,926 B2
(45) Date of Patent: *Jan. 11, 2022

(54) SYSTEMS AND METHODS FOR STATISTICALLY ASSOCIATING MOBILE DEVICES AND NON-MOBILE DEVICES WITH GEOGRAPHIC AREAS

(71) Applicant: 4INFO, INC., San Mateo, CA (US)

(72) Inventors: Timothy W. Jenkins, San Jose, CA (US); Arash Saffarnia, Belmont, CA (US); Prashant Chaudhary, Santa Clara, CA (US); Gautham Anil, Fremont, CA (US)

(73) Assignee: 4INFO, INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/551,423

(22) Filed: Aug. 26, 2019

(65) Prior Publication Data
US 2020/0228922 A1 Jul. 16, 2020

Related U.S. Application Data

(63) Continuation of application No. 16/050,982, filed on Jul. 31, 2018, now Pat. No. 10,419,883.
(Continued)

(51) Int. Cl.
H04W 24/00 (2009.01)
H04W 4/02 (2018.01)
(Continued)

(52) U.S. Cl.
CPC ......... *H04W 4/025* (2013.01); *H04L 61/2007* (2013.01); *H04W 4/029* (2018.02);
(Continued)

(58) Field of Classification Search
CPC ....... H04W 4/025; H04W 4/33; H04W 4/029; H04W 64/00; H04L 61/2007
See application file for complete search history.

(56) References Cited

U.S. PATENT DOCUMENTS 5,852,630 A 12/1998 Langberg et al.
8,510,773 B1 8/2013 Abou-Rizk et al.
(Continued)

Primary Examiner — Erika A Washington
(74) Attorney, Agent, or Firm — Knobbe Martens Olson & Bear LLP

(57) ABSTRACT

Systems and techniques are disclosed for statistically associating mobile devices and non-mobile devices with geographic areas. One of the methods includes for each selected mobile device of a plurality of mobile devices, receiving latitude-longitude pairs for the selected mobile device, the latitude-longitude pairs corresponding to a location of the selected mobile device during a time period. The plurality of latitude-longitude pairs are organized into clusters, with the clusters corresponding to geographic regions visited by the selected mobile device during the time period. A score is calculated for each cluster, the score representing a likelihood that a user of the selected mobile device resides in a household within the cluster. A location of the user's household is identified to be within one of the geographic areas corresponding to the cluster having the highest score. The mobile device is associated with the geographic area having the highest score.

17 Claims, 5 Drawing Sheets

Related U.S. Application Data

(60) Provisional application No. 62/539,397, filed on Jul. 31, 2017.

(51) Int. Cl.
*H04L 29/12* (2006.01)
*H04W 4/33* (2018.01)
*H04W 64/00* (2009.01)
*H04W 4/029* (2018.01)

(52) U.S. Cl.
CPC ............ *H04W 4/33* (2018.02); *H04W 64/00* (2013.01); *H04L 61/2514* (2013.01)

(56) References Cited

U.S. PATENT DOCUMENTS

| | | | |
|---|---|---|---|
| 8,732,737 B1 * | 5/2014 | Kalmes | H04H 20/38 725/14 |
| 8,755,817 B2 | 6/2014 | Nagara et al. | |
| 8,792,909 B1 * | 7/2014 | Xu | H04W 4/029 455/456.1 |
| 8,863,178 B1 | 10/2014 | Abou-Rizk et al. | |
| 8,880,097 B1 | 11/2014 | Xu et al. | |
| 8,996,033 B1 | 3/2015 | Xu et al. | |
| 9,291,700 B1 | 3/2016 | Rose et al. | |
| 9,307,360 B1 | 4/2016 | Zhyshko | |
| 9,374,671 B1 | 6/2016 | Zhyshko et al. | |
| 9,396,210 B1 | 7/2016 | Crook et al. | |
| 9,449,334 B1 | 9/2016 | Abou-Rizk et al. | |
| 9,503,863 B2 | 11/2016 | Rose et al. | |
| 9,547,666 B2 | 1/2017 | Ching et al. | |
| 9,668,104 B1 | 5/2017 | Ching et al. | |
| 9,730,028 B2 | 8/2017 | Rose et al. | |
| 9,756,465 B2 | 9/2017 | Zhyshko | |
| 9,769,619 B2 | 9/2017 | Zhyshko et al. | |
| 9,788,158 B1 | 10/2017 | Rothman et al. | |
| 10,216,551 B1 * | 2/2019 | Jha | G06F 9/542 |
| 10,419,883 B2 * | 9/2019 | Jenkins | H04W 4/33 |
| 2003/0033273 A1 | 2/2003 | Wyse | |
| 2007/0067214 A1 | 3/2007 | Caprio et al. | |
| 2007/0179792 A1 | 8/2007 | Kramer | |
| 2008/0090513 A1 | 4/2008 | Collins et al. | |
| 2008/0248815 A1 | 10/2008 | Busch | |
| 2008/0262901 A1 | 10/2008 | Banga et al. | |
| 2008/0262929 A1 | 10/2008 | Behr | |
| 2010/0004997 A1 | 1/2010 | Mehta et al. | |
| 2010/0134352 A1 | 6/2010 | Thomson et al. | |
| 2011/0184945 A1 | 7/2011 | Das et al. | |
| 2012/0304292 A1 | 11/2012 | Liu et al. | |
| 2013/0318077 A1 | 11/2013 | Greenzeiger et al. | |
| 2014/0082008 A1 | 3/2014 | Johnson | |
| 2014/0232593 A1 | 8/2014 | Varoglu | |
| 2014/0310162 A1 | 10/2014 | Collins | |
| 2014/0365304 A1 * | 12/2014 | Showers | G01S 5/0252 705/14.55 |
| 2015/0052554 A1 * | 2/2015 | Iyengar | G06Q 30/0205 725/35 |
| 2015/0100426 A1 * | 4/2015 | Hartzell | H04W 4/02 705/14.58 |
| 2015/0222659 A1 | 8/2015 | Abou-Rizk et al. | |
| 2016/0112522 A1 * | 4/2016 | Abello | H04L 67/02 709/224 |
| 2016/0295371 A1 | 10/2016 | Zhyshko et al. | |
| 2016/0330592 A1 | 11/2016 | Crook et al. | |
| 2017/0011424 A1 | 1/2017 | Abou-Rizk et al. | |
| 2017/0048677 A1 | 2/2017 | Rose et al. | |
| 2017/0124102 A1 | 5/2017 | Ching et al. | |
| 2017/0206559 A1 * | 7/2017 | Bakshi | H04L 67/22 |
| 2017/0318434 A1 | 11/2017 | Rose et al. | |
| 2017/0347231 A1 | 11/2017 | Zhyshko | |
| 2017/0347242 A1 | 11/2017 | Ching et al. | |
| 2017/0350705 A1 | 12/2017 | D'alberto et al. | |
| 2017/0353825 A1 | 12/2017 | D'alberto et al. | |
| 2017/0353826 A1 | 12/2017 | D'alberto et al. | |
| 2017/0353827 A1 | 12/2017 | D'alberto et al. | |
| 2017/0353941 A1 | 12/2017 | D'alberto et al. | |
| 2017/0374521 A1 | 12/2017 | Zhyshko et al. | |
| 2018/0070329 A1 | 3/2018 | Rothman et al. | |
| 2018/0114249 A1 * | 4/2018 | Malkin | G06N 5/048 |
| 2018/0158104 A1 * | 6/2018 | Malloy | H04L 67/18 |

* cited by examiner

SYSTEMS AND METHODS FOR STATISTICALLY ASSOCIATING MOBILE DEVICES AND NON-MOBILE DEVICES WITH GEOGRAPHIC AREAS

CROSS-REFERENCE TO RELATED APPLICATIONS

This application claims priority to, and is a continuation of, U.S. patent application Ser. No. 16/050,982 corresponding to U.S. Pat. No. 10,419,883, which is hereby incorporated herein by reference in its entirety. Any and all applications for which a foreign or domestic priority claim is identified in the Application Data Sheet as filed with the present application are hereby incorporated by reference under 37 CFR 1.57.

This application hereby additionally incorporates by reference U.S. Pat. No. 8,792,909, filed on Dec. 4, 2013 as U.S. patent application Ser. No. 14/096,597, in its entirety for all purposes.

BACKGROUND

With the proliferation of internet connected devices, such as the spread of the "internet-of-things" devices, persons in a household may utilize multitudes of such devices. For example, a person may rely on their smartphone for a mobile connection to the internet. The person may also utilize a smart TV to view content streamed over the internet. Additionally, the person may utilize a smart appliance, for example a refrigerator, connected to the internet to perform disparate functionality. Example functionality may include ordering items determined to be lacking or on low supply within the refrigerator.

Due to this proliferation, persons residing in a same household may view or access content on any of the devices. For example, a person may view content directed to a particular television show on a personal computer or mobile device. The person may later view the particular television show via a smart TV device or smart TV software executing on the person's television.

SUMMARY

This specification describes technical schemes that may be utilized to obtain multiple technological advantages. Determining that a digital mobile device, for example a smart TV, laptop, cellular or smart phone (which may be referred to interchangeably herein unless otherwise indicated), tablet, an automobile, or other digital device, that can connect to the internet belongs to a particular person, household, neighborhood (or larger geographic area), can present great technological hurdles. Additionally, determining that multiple devices, with no clear link between them, are associated with a same person presents increased technological hurdles.

"Offline" data such as income, credit card transactions, household size and vehicle ownership often exist at a person, household, neighborhood or other geographic area. In contrast, device level information, such as digital content consumed, mobile geolocation information and ad exposure, is often collected and stored via an IP address (laptops and smart TV) or mobile ad ID (mobile device) with no easy way to connect the data to offline information. In addition, although data ecosystems exist in the United States with data at a person or household level, this does not always apply internationally where data may be aggregated at less granular geographic areas, for practical or privacy reasons. In addition, the home address databases in some countries do not have granular enough geocoding to enable direct device to household association. Direct device to household association is described in U.S. Pat. No. 8,792,909, which is hereby incorporated by reference for all purposes.

Certain aspects of the techniques described herein relate to methods and systems for associating mobile devices and IP addresses to residences, neighborhoods and other geographic areas. Certain clustering technology can be used for identifying the set of locations visited by mobile devices by analyzing clusters of geolocation data associated with a mobile device. This geolocation information is typically obtained via mobile advertising exchanges but can also come directly from mobile apps, data collection intermediaries, and or other information provided by a mobile device.

Longitudinal geolocation information from mobile devices can be clustered into small geographic areas, typically the size of a household, then an algorithm which considers location frequency, adjacent geolocation data and other information, assigns a probability to the most likely household where the owner of the device resides. To solve the address problems described above, and other problems, other methods can be used for additional associations. In some implementations, to address instances where, for example, particular household information is not available or the demographics of an area are similar within a defined regions, the device assignment can be expanded from a single household to a set of households of an arbitrary size. In various instances, the set of households could be a block, neighborhood, a portion of a town, a town, a regions or other geographic area such as a DMA (designated marketing area). In some implementations, the types of devices that are determined to be associated with a household, or a set of households, are extended from mobile devices to any device within a household that uses a household internet service.

Systems and methods are described for associating mobile devices and non-mobile devices with geographic areas. One innovation includes a method of associating a plurality of mobile devices to one of a plurality of defined geographic areas that includes a plurality of households. The method includes, for each selected mobile device of a plurality of mobile devices, receiving a plurality of latitude-longitude pairs for the selected mobile device, the latitude-longitude pairs corresponding to a location of the selected mobile device during a time period, organizing the plurality of latitude-longitude pairs into a plurality of clusters, the clusters corresponding to geographic regions visited by the selected mobile device during the time period, calculating a score for each cluster, the score representing a likelihood that a user of the selected mobile device resides in a household within the cluster, identifying a location of the user's household to be within the one of the plurality of geographic areas corresponding to the cluster having the highest score, and associating the mobile device with the one of the plurality of geographic areas having the highest score.

Various embodiments include other aspects. The method may further include receiving a timestamp and a first IP address from the selected mobile device, associating the first IP address with a first household in the one of the plurality of geographic areas associated with the selected mobile device, receiving a plurality of data sets including IP addresses and corresponding timestamps for a plurality of computing devices, determining a matched group of computing devices that have the same IP address as the first IP address, and associating the matched group of computing devices to the first household and to the same one of the plurality of geographic areas associated with the selected mobile device. Determining a matched group of computing devices that have the same IP address as the first IP address may include matching the IP address of one or more of the plurality of computing devices to the first IP address when the timestamp of the data set for the computing device is within a certain time duration of the timestamp from the selected mobile device. In another aspect, the method may further include receiving a user input indicating the time duration. In another aspect, the time duration may be determined at least in part by the time of day. In another aspect, the time duration may be determined at least in part by the location information of the selected mobile device. The method may further include increasing the time duration when the location information of the selected mobile device indicates the mobile device is substantially stationary. In some aspects of the method, the latitude-longitude pairs are obtained using a technique selected from the group consisting of global positioning with a global positioning system, cellular triangulation, and/or Wi-Fi identification. In some aspects of the method, the time period is selected from an hour, a day, a week, or a month. The mobile device may be selected from a cellular phone, a portable computing device, and a tablet computer. In another aspect, the latitude-longitude pairs are associated with an ad request sent by the mobile device. In another aspect, calculating the score comprises applying a weight based on at least one of a time and a location associated with a longitude-latitude pair.

Another innovation includes a system for associating a mobile device to a household, the system including a data storage device operating on a server computer, the data storage device storing a plurality of latitude-longitude pairs for a mobile device, the latitude-longitude pairs corresponding to a location of the mobile device during a time period, and an electronic hardware processor executing computer-readable instructions that, when executed, for each selected mobile device of a plurality of mobile devices, receives a plurality of latitude-longitude pairs for the selected mobile device, the latitude-longitude pairs corresponding to a location of the selected mobile device during a time period, organizes the plurality of latitude-longitude pairs into a plurality of clusters, the clusters corresponding to geographic regions visited by the selected mobile device during the time period, calculates a score for each cluster, the score representing a likelihood that a user of the selected mobile device resides in a household within the cluster, identifies a location of the user's household to be within the one of the plurality of geographic areas corresponding to the cluster having the highest score, and associates the mobile device with the one of the plurality of geographic areas having the highest score. The electronic hardware processor may be further configured for executing computer-readable instructions that, that when executed cause the processor to retrieve a timestamp and a first IP address from the selected mobile device, associate the first IP address with a first household in the one of the plurality of geographic areas associated with the selected mobile device, retrieve a plurality of data sets including IP addresses and corresponding timestamps for a plurality of computing devices, determine a matched group of computing devices that have the same IP address as the first IP address, and associate the matched group of computing devices to the first household and to the same one of the plurality of geographic areas associated with the selected mobile device. In one aspect of this system, determining a matched group of computing devices that have the same IP address as the first IP address includes matching the IP address of one or more of the plurality of computing devices to the first IP address when the timestamp of the data set for the computing device is within a certain time duration of the timestamp from the selected mobile device.

Another innovation includes a non-transitory computer program product embodied on a computer-readable medium and comprising computer code for associating a mobile device to a household, the code comprising instructions for, for each selected mobile device of a plurality of mobile devices, receiving a plurality of latitude-longitude pairs for the selected mobile device, the latitude-longitude pairs corresponding to a location of the selected mobile device during a time period, organizing the plurality of latitude-longitude pairs into a plurality of clusters, the clusters corresponding to geographic regions visited by the selected mobile device during the time period, calculating a score for each cluster, the score representing a likelihood that a user of the selected mobile device resides in a household within the cluster, identifying a location of the user's household to be within the one of the plurality of geographic areas corresponding to the cluster having the highest score, and associating the mobile device with the one of the plurality of geographic areas having the highest score. The non-transitory computer program product may further include code that comprises instructions for receiving a timestamp and a first IP address from the selected mobile device, associating the first IP address with a first household in the one of the plurality of geographic areas associated with the selected mobile device, receiving a plurality of data sets including IP addresses and corresponding timestamps for a plurality of computing devices, determining a matched group of computing devices that have the same IP address as the first IP address, and associating the matched group of computing devices to the first household and to the same one of the plurality of geographic areas associated with the selected mobile device. Ins some aspects, of the non-transitory computer program product determining a matched group of computing devices that have the same IP address as the first IP address includes matching the IP address of one or more of the plurality of computing devices to the first IP address when the timestamp of the data set for the computing device is within a certain time duration of the timestamp from the selected mobile device.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Although particular embodiments are described herein, other embodiments, including embodiments that do not provide all of the benefits and features set forth herein, will be apparent to those of ordinary skill in the art.

This specification describes techniques for associating different devices with a same determined geographic location. For example, the geographic location may be a street address of a home or may be an arbitrary polygon which is a portion of (or divides) a larger geographic areas (e.g., a 'manzana' as described below). The devices may include any network-enabled or internet connected device, such as a smart phone, tablet, wearable device, smart TV device, smart refrigerator, personal assistant device, and so on. It should be appreciated that residences in particular localities may not be identifiable by the street address designation utilized in other localities. For example, an example country may group residences together into clusters (e.g., an irregular geographic area, such as a 'manzana'). These clusters may each be identifiable, but the specific residences within each cluster may not otherwise be separately identifiable. Advantageously, and as will be described, the determined geographic location may correspond to one of the clusters. Thus, the techniques described herein are applicable to a wide-range of localities.

As an example, the system can obtain information being transmitted by a user device of a user. For example, the information may be anonymized and indicate one or more identifiers associated with the user device (e.g., ad identifiers, cookie identifiers, and so on). This information may include location information of the user device, such as global navigation satellite system information (e.g., GNSS coordinates), cellular triangulation information, Wi-Fi identification information, and so on. The information may be, as an example, associated with advertisements or other content items presented on the user device of the user. For instance, an ad request may be transmitted from the user device with the information described above. These ad requests may be triggered at different frequencies, for example upon the user utilizing a particular application executing on the user's user device (e.g., an "app" obtained from an electronic application store). Thus, the system may obtain this information over time and with varying frequencies.

Figure 5:
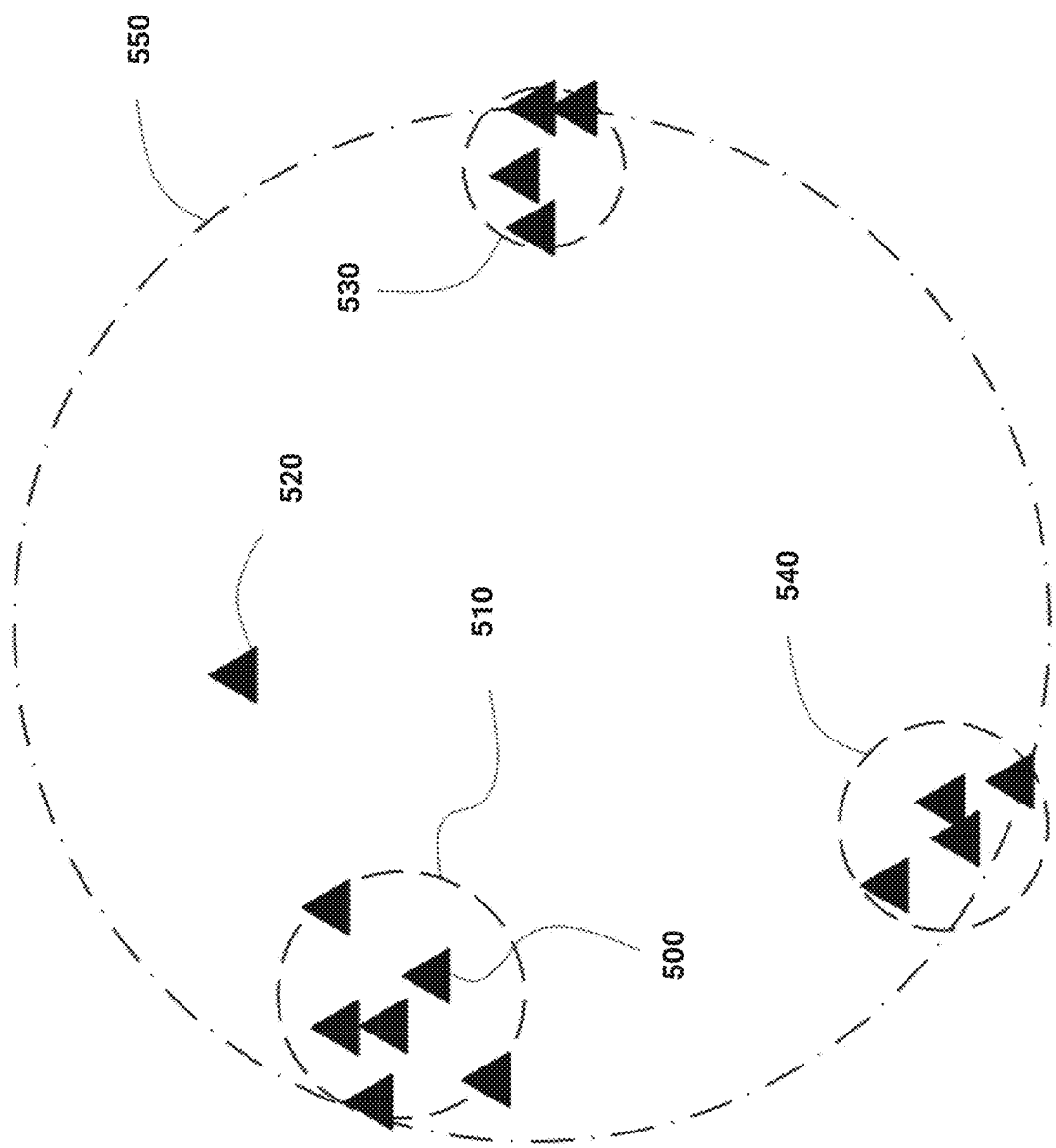
FIG. 5 illustrates an example of clustering.

Based on the above-described location information, the system can access information associating locations to corresponding to residences or geographic areas. For example, certain databases may be accessed, or maintained, that can translate between a residence address and a latitude-longitude pair corresponding to a location on the street or a point at rooftop of the residence. As will be described below, the system can cluster the locations of the user according to various schemes. For example, FIG. 5 illustrates examples of clusters determined from location information of a user. Based on this clustering, and optionally time information associated with the locations, the system can determine a residence corresponding to the user. Since the databases described above may include address information, the system can determine an address associated with the user's residence.

While reference above was made to determining a residence based on clustering, it should be understood that additional techniques may be utilized. For example, the system may obtain satellite images corresponding to locations transmitted by the user's user device. Optionally, this satellite images may be analyzed to identify features corresponding to residential areas. Example features may include homes. Similar to the above, the system may access databases indicating residential areas. For example, the databases may indicate zoning information. Thus, the system may utilize the images optionally along with the databases to determine that particular locations correspond to the user's residence.

As described above, the system may also enable a broader definition of geographic area than particular street or residence address. In order to assign a device to a geographic area, the system can first determine a list of the geolocations of residences or the defined geographic area of interest. Second, geolocation data from mobile devices can be received and ordered, and the centroids of location clusters for each mobile device may be determined. Third, the system can determine which clusters are most likely assigned to a household by comparing the latitude and longitude associated with each cluster with the latitude and longitude associated with each residence geolocation. In this embodiment, the system may treat any arbitrary geolocation as if it were a residence. For example, the arbitrary geolocation may be the center of a town. As another example, a geographic area may be divided into respective polygonal shapes (e.g., a 'manzana') such that the geographic area is represented as two or more areas (e.g., the polygonal shapes) each smaller than the initial geographic area. The system may therefore associate a user device to a particular polygonal shape. As described above, certain countries or regions may not allow for a precise residential address. Thus, the system may still enable the associations between user device and residence as described herein utilizing the most fine-grained detail that is possible (e.g., based on the residential or address information which is available).

As an example, 1 million people may be living in a region of a particular country. This country may disallow the translation between GNSS coordinates and a specific residential address (e.g., street address). For example, as described above one or more databases may identify residential addressees as corresponding to different locations (e.g., GNSS coordinates, latitude/longitude pairs). Thus, the system described herein may obtain location information corresponding to a mobile device, and utilizing the databases determine a likely residence corresponding to a user of the mobile device. Examples of this determination are described below, and may be based on machine learning models and/or statistical methods. However, the above-described country may not allow for such databases. Additionally, such databases may not exist for this country. For example, residences may be grouped into particular areas without formal definition as to street and street number. This may present great technical hurdles to associate mobile devices of the 1 million people to residences. Thus, the system described herein can improve upon association schemes to enable association between user devices and corresponding geographic areas.

The above describes a method for associating a mobile device to a geographical area for the purpose of appending data among other potential reasons. Since the mobile device may generate location information based on particular requests (e.g., ad requests as described above), such a method can be readily applied. However, this may not handle internet connected devices which might not provide geolocation data. In many cases, devices that use web browsing technology as the primary user interface, such as laptops and desktop computers, do not provide, or provide limited, geolocation data. However, it can be determined which non-mobile internet connected devices are associated with specific geographic areas, even when they do not provide location information. As will be described, the system described herein can utilize network information associated with the geographic areas. For example, a Wi-Fi router in a person's home may be associated with an IP address. The system can determine that a particular mobile device is used by a user who resides at a particular geographic area (e.g., a specific residence, or arbitrary polygonal shape of a geographic area). If this particular mobile device connects to the Wi-Fi network, the system may obtain the IP address associated with the geographic area. As other devices, such as laptops, smart TV devices, and so on, transmit information over the internet, these devices will also utilize the same IP address. Thus, the system described herein can associate these other devices with the mobile device. Since IP addresses can change, the system can record the timestamps associated with IP addresses, to determine a time window for which each IP address is assigned to each device. In this way, once it is determined which IP addresses are associated with a given mobile device, the system can assign any device with the same IP address to the same household or geographic area.

Figure 1:
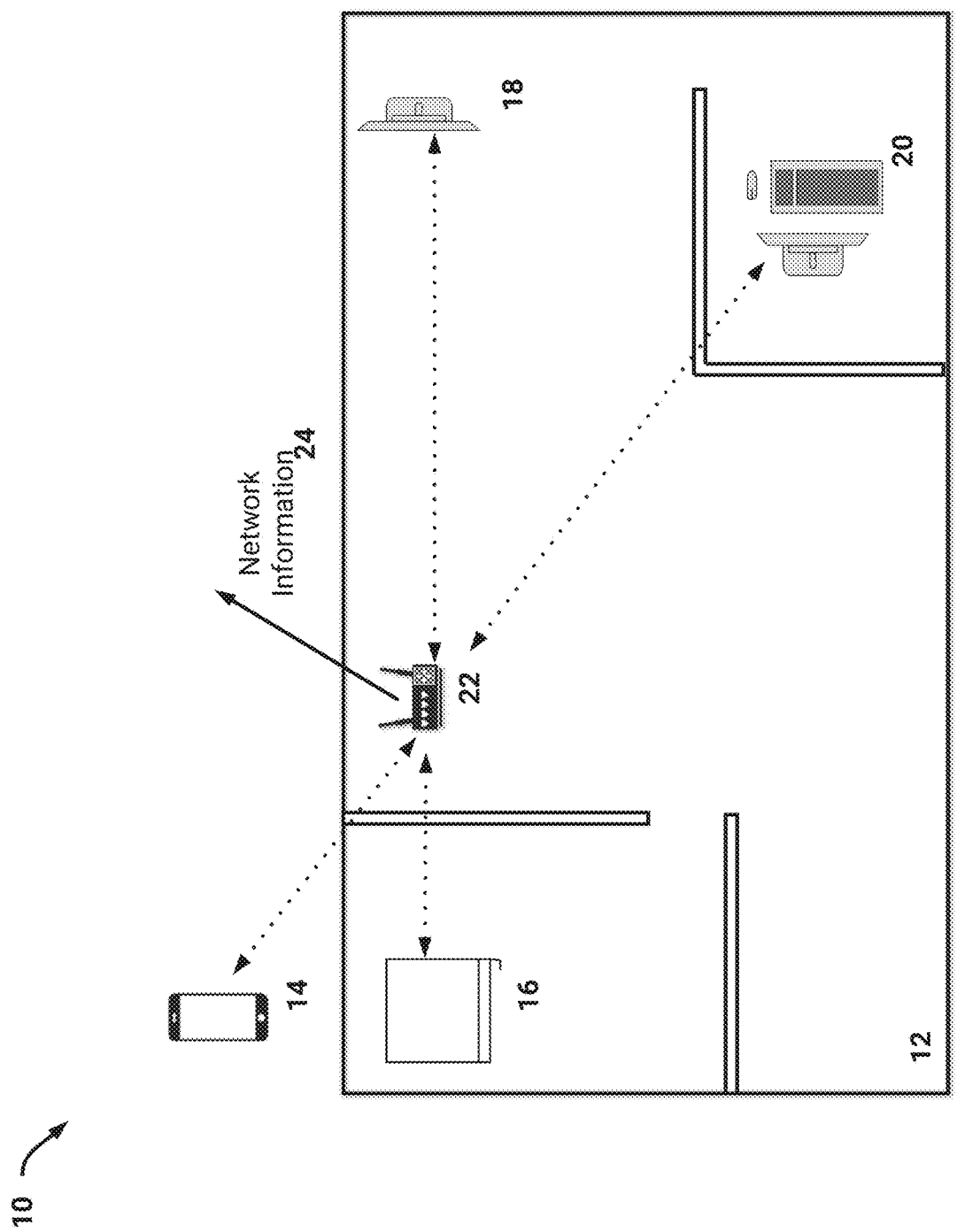
FIG. 1 is a block diagram illustrating an example of determining associations between devices corresponding to a same determined location.

FIG. 1 illustrates an example block diagram 10 of determining associations between devices 14, 16, 18, and 20 corresponding to a same determined location 12. As illustrated in this example, the location 12 is a residence 12 (e.g., a home, apartment, or the like) that includes (or is associated with) one or more devices, such as a mobile device 14, smart refrigerator 16, smart TV or smart TV device 18, and laptop or desktop computer 20. Additionally, a router 22 (e.g., a Wi-Fi router) is included in the residence 12 which can enable networked communications between the internet and the devices 14-20.

It should be appreciated that the router 22 may be connected to, or in communication with, a modem. For example, the modem may be a cable modem, digital subscriber line (DSL) modem, fiber-optic modem, and so on. As is known, the modem may be assigned a particular internet protocol (IP) address. The devices 14-20 may be in communication with the router 22, and via network address translation may be assigned particular internal addresses (e.g., based on a subnet). For example, when connected to the router 22 (e.g., via a wired or wireless connection), the smart refrigerator 16 may be assigned an internal IP address (e.g., 192.168.1.100). As another example, when connected to the router 22, the smart TV 18 may be assigned a different internal IP address.

The router 22 may receive information from the devices 14-20 for routing (e.g., for routing to the internet). For example, FIG. 1 illustrates the devices 14-20 providing information, and the router 22 routing network information 24. The router 22 may maintain information identifying the internal addresses of the devices 14-20, for example via a network routing table, such that the router 22 may properly enable internet communication with the devices 14-20. Thus, the network information 24 from the disparate devices 14-20 may be provided via the same router 22. In this way, an IP address associated with the network information 24 may be the same.

As will be described in more detail, the mobile device 14 may be determined to be associated with the residence 12. For example, the mobile device 14 may transmit requests (e.g., ad requests) that include one or more unique identifiers associated with the device 14 along with location information. As a user of the mobile device 14 moves about the user's day, the location information may reflect the movement. Via the techniques described herein, and at least in part in U.S. Pat. No. 8,792,909, a system may utilize the location information to associate the residence 12 to the mobile device 14. The mobile device 14 may connect to the router 22, for example while the user of the mobile device 14 is at the residence 12. When mobile device 14 transmits the requests described above, the requests will thus include the IP address associated with the router 22. Since the residence 12 has been associated with the mobile device 14, the IP address can therefore also be associated as corresponding to the residence 12.

As the remaining devices 16-20 are utilized, they may similarly provide requests (e.g., ad requests) that include one or more unique identifiers and the IP address associated with the router 22. As an example, as a user utilizes the smart TV 18 to request, for example, streaming television, particular requests may be provided. In this example, the smart TV 18 may trigger requests for content items, such as advertisements, for presentation on the smart TV 18. These requests may be ingested by a system (e.g., the location association system 100) and analyzed. For example, the system may cause a grouping of requests by IP addresses. Without being constrained by technical implementation, the system may generate a record, such as a database table or information for a graph database, associated with an IP address. The system may additionally generate records indicating associations between user devices and IP addresses of residences. The system may then perform a join on the above-described record information, to generate information indicating mobile devices, and other devices 16-20, associated with same IP addresses.

Since the mobile device 14 has been associated with the residence 12, the devices 16-20 may similarly be associated with the residence 12. For example, based on the mobile device 14 connecting to the router 22 the system may associate the IP address of the router 22 to the device 14. Thus, for any requests, or other network information 24, from devices 16-20 that include the IP address, the system may associate these devices 16-20 with the residence 12. Optionally, an IP address associated with a cellular company may be discarded, and only IP addresses associated with internet service providers may be considered to be associated with a residence.

However, since the mobile device 14 may connect to other Wi-Fi networks (e.g., a work network, a coffee chain network), the system described herein may utilize statistical and/or machine learning techniques to associate a correct IP address with the residence 12. For example, the system may estimate a location based on the numerical values of an IP address included in a request from the mobile device 14. This estimated location may be compared to a location of the residence 12 associated with the mobile device 12. If the estimated location is within a threshold distance of the location of the residence 12, the system may determine that the IP address is associated with the residence 12. In some implementations, the system may increase a likelihood of the IP address being associated with the residence 12. Similarly, when the mobile device 14 is connected to the router 22, requests from the mobile device 14 may include an IP address and location information (e.g., GNSS coordinates). The system may determine that the mobile device 14 is at the residence 12 based on the location information. The IP address can therefore be associated with the residence 12 based upon a positive determination. As another example, the system may utilize time information associated with the requests (e.g., timestamp information). The system may assume that a user is more likely to be at his/her residence during certain times (e.g., night time, certain days or months, and so on). Thus, the system may associate the IP address of the router 22 with the residence 12. As another example, the system may obtain a first request from a mobile device indicating the mobile device is within a threshold distance of the residence associated with the mobile device (e.g. based on location information included in the first request). The system may then obtain a second request from the mobile device indicating a particular IP address. If the timestamps of these two request indicate they are within a threshold amount of time, the system may assume the mobile device connected to a Wi-Fi network of the residence. The system may optionally combine one or more of the techniques described herein.

In this way, the system described herein may associate all internet-connected devices with the residence 12. Therefore, the system may optionally enable sharing of content requests between devices 14, 16, 18, and 20. For example, an ad request may be provided by desktop 20. Additionally, a different ad request may be provided by smart TV 18. These ad requests may be provided, for example to an outside system, via router 22. Since desktop 20 and smart TV 18 have been associated to the residence 12, the outside system may utilize any information generated for a user of the residence 12 to service the ad requests. As an example, if user was browsing content (e.g., web pages) related to a particular subject, the outside system may service the request to the smart TV 18 with streaming shows related to the particular subject.

Figure 2:
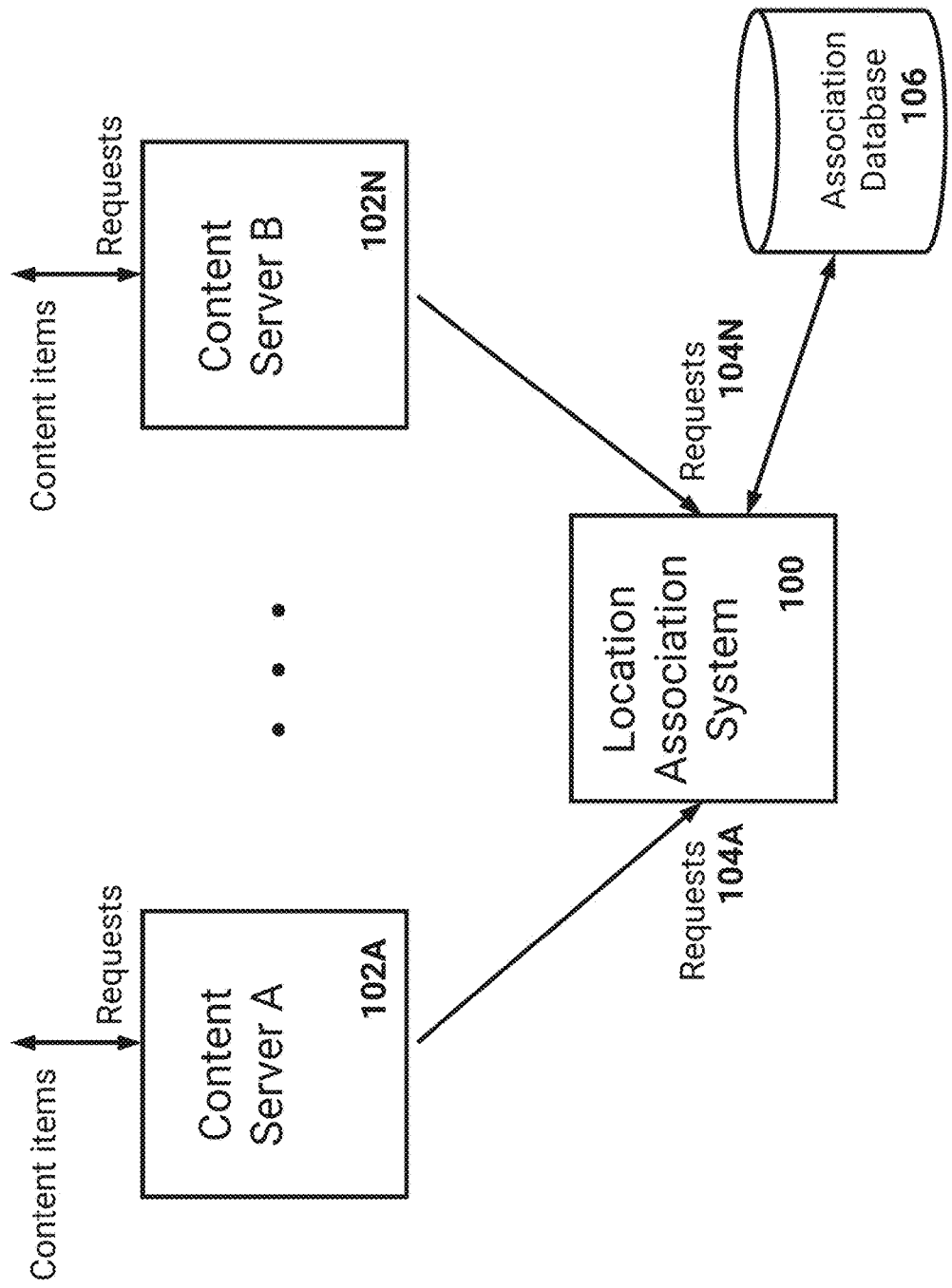
FIG. 2 is a block diagram illustrating an example location association system.

FIG. 2 illustrates a block diagram of an example location association system 100. The location association system 100 may be a system of one or more computers, one or more virtual machines executing on a system of one or more computers, and so on. As illustrated, the location association system 100 may receive information from content servers 102A-102N and generate information associating devices to residences for storage in a database 106 (e.g., association database 106). The content servers 102A-102N may respond to requests received from devices, for example with content items (e.g., advertisements). As described in FIG. 1, the requests may optionally indicate location information. For example, mobile devices may transmit location information. Optionally, for devices which are not mobile or do not include GNSS receivers, the requests may indicate unique identifiers along with IP addresses (e.g., associated with devices from which they were sent). Example devices may include (e.g., laptops, smart TVs, personal assistant devices, video game consoles, and so on).

As described above, a same person may own multiple devices. The location association system 100 can associate these devices with each other, and also with a determined residence of the person. To associate the devices, the location association system 100 can generate information indicating associations between determined residences and mobile devices. For example, the location association system 100 may monitor location information obtained from a mobile device of a person. The location association system 100 may then cluster the location information, and determine a likely cluster in which the person's residence is located. One or more databases indicating addresses of households may then be accessed. In some implementations, a household located closest to a centroid of the determined cluster can be determined to correspond to the person's residence. Optionally, in implementations in which the databases do not indicate addresses, the person's residence may be indicated as a closest indicated geographic region to a centroid of the cluster. Thus, the location association system 100 may determine residences corresponding to mobile devices. The location association system 100 may optionally determine a workplace corresponding to the mobile device.

Based on the associations between residences and mobile devices, the location association system 100 may determine the remaining devices included in each residence. As an example of determining remaining devices, a first request may be provided from a mobile device to content server A 102A. If the mobile device is connected to a router (e.g., a wireless or wired router), the request can include an IP address. As described above, the location association system 100 can determine that the IP address corresponds to a residence associated with the mobile device. As an example, if the request includes location information, the location association system 100 may determine whether the location information corresponds to the determined residence associated with the mobile device. If the request does not include location information, the location association system 100 may determine an estimated location from the IP address. Without being constrained by theory, an estimated location may be based on an internet service provider associated with the IP address. For example, the internet service provider may partition subscribers up according to geographic area. Thus, particular databases may be accessed which indicate approximate locations that may correspond to a provided IP address.

As another example, the location association system 100 may obtain timestamp information included in the first request. This timestamp information may be combined with a multitude of other requests from the mobile device. For example, the location association system 100 may identify the requests as corresponding to the mobile device based on the unique identifiers included in the requests. The location association system 100 may then determine an IP address associated with the residence as corresponding to the IP address included in requests transmitted during the evening and/or night time. Based on a commonality associated with the same IP address being utilized in the evening and/or night time, the location association system 100 can determine that the IP address is associated with the residence. Optionally, the location association system 100 may determine a number of devices associated with a same IP address. The location association system 100 can determine an average number of times each device provides requests via the IP address. If the average number is below a threshold, this may indicate that the IP address corresponds to a publicly accessible wireless network (e.g., a coffee shop). Thus, the location association system 100 may discard this IP address as not corresponding to a residence.

The location association system 100 may access datasets generated by the content servers 102A-102N, which may include information obtained from the requests provided to the content servers 102A-102N. Based on these datasets, the location association system 100 can determine a group or set of devices that are associated with a same residence. With respect to the first request described above, the location association system 100 may identify all requests in the datasets which indicate the same IP address as included in the first request. These requests may all be determined by the location association system 100 to therefore be associated with the same residence. Since each request may further indicate unique identifiers associated with each device, the location association system 100 may further separate the requests according to unique device. Thus, the location association system 100 can determine the devices that are associated with the residence.

Figure 3:
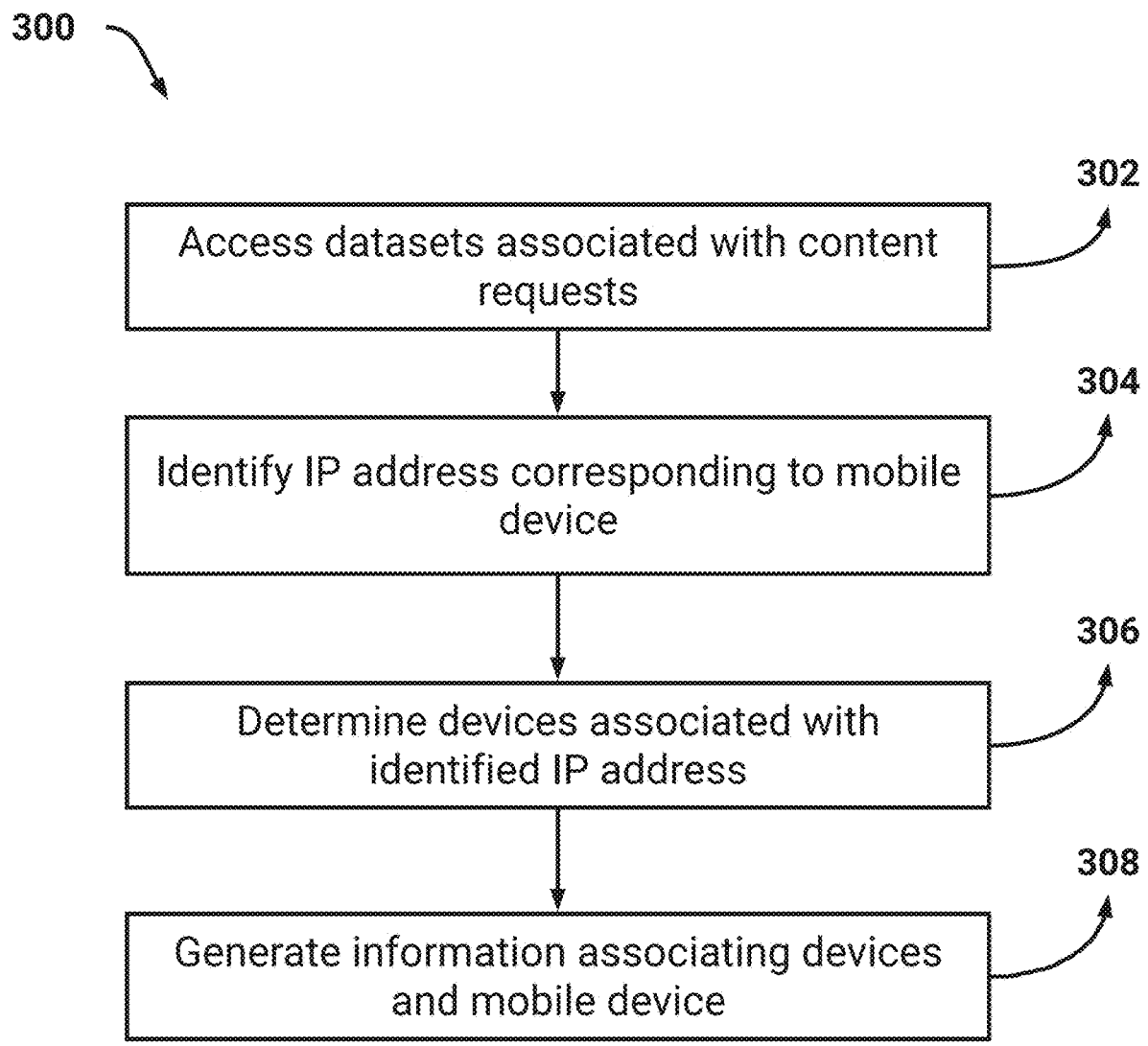
FIG. 3 illustrates a flowchart of an example process for determining associations between devices.

FIG. 3 illustrates a flowchart of an example process 300 for determining associations between devices. For convenience, the process 300 will be described as being performed by a system of one or more computers (e.g., the location association system 100).

At block 302, the system accesses datasets associated with content requests. As described in FIGS. 1-2, the system may obtain, or otherwise access, datasets of different requests (e.g., ad requests). These datasets may be generated by content providers, for example in response to receipt of the requests. A request may include, for example, one or more of: unique identifiers (e.g., an ad ID), location information, an IP address associated with the request, timestamp information, and so on. It should be understood that a request may be transmitted based on various actions which may trigger the request. As an example, an action may include a user device executing a particular application. This application may trigger a request to one or more content providers, and in response may receive one or more content items for presentation via the application. As another example, an action may include a smart TV requesting content items for presentation via the smart TV.

As another example, an action may include a smart refrigerator requesting content items for presentation via the smart refrigerator. Optionally, the action may include the smart refrigerator providing certain information to a content server (e.g., information indicating types of food utilized by a user, who may be anonymized). In this example, the content server may not provide content items in response, but may still generate information associated with the received information. As another example, a request may be triggered by a user device requesting a particular web page. Optionally, a server hosting the web page may cause the request to be provided to a content server. The content server may then provide a content item for inclusion in the web page. For example, the content server may provide the content item to the server or to the user device.

Thus, the different content servers may maintain datasets that include requests, or other received information, that identify unique identifiers, originating IP addresses, optionally location information, and so on. The system may obtain the datasets for analysis via the internet, ingest the information over a local or wide area network, and so on. Optionally, the datasets may be represented at database tables with each row of a database table representing a record of a request or other received information. These datasets may therefore include hundreds of thousands, millions, and/or hundreds of millions or more different records. Since the records include reference to unique identifiers, sensitive or private information may be removed prior to analysis by the system.

At block 304, the system identifies an IP address corresponding to a mobile device. As will be described in more detail below, the system may associate a mobile device to a particular residence. The residence may be associated with a particular street address, or may optionally represent a geographic area in which one or more residences are included. The mobile device may, in general, be connected to a cellular network (e.g., a Long-Term Evolution network). However, the mobile device may be connected to a wired or wireless network associated with the residence (e.g., at different times). As a user of the mobile device uses the mobile device, requests or other information may be received by content servers. Thus, the datasets accessed by the system may include records reflecting the mobile device being connected to the wired or wireless network.

The system may analyze the datasets to identify records associated with the mobile device. For example, the system may identify the unique identifiers associated with the mobile device. These unique identifiers may optionally be distinct between content servers. As an example, a first content server may identify the mobile device via a first uniquely generated string. In this example, a second content server may identify the mobile device via a second uniquely generated string. The system may correlate the first string and second string based on one or more factors and/or one or more machine learning models. For example, the system may utilize timestamp information, along with location information, to determine that a same mobile device provided requests identifying the first string and second string. As an example, a first request may include the first string along with timestamp and location information. A second request may include the second string along with timestamp and location information. If the timestamps are within a threshold time, and the locations are within a threshold distance, the system may increase a likelihood that they were provided via a same user device. For example, the system may determine that these records match a same user device. As additional matching records are identified in the datasets, the system may increase the likelihood. Optionally, the system may have access to anonymized user preference or user interest data. For example, the datasets may describe the content that was provided in response to the requests. The system may utilize this information to determine a likelihood that a same user device is identified by different unique identifiers.

In this way, the system may analyze the datasets to identify an IP address associated with one or more requests from the mobile device. Since the mobile device has, as described above, been associated with a residence, the IP address may similarly be associated with the residence. For example, the system may utilize one or more unique identifiers that are known to be associated with the mobile device. The system may then analyze the datasets, and identify records associated with the mobile device that reflect IP addresses. As described above in FIGS. 1-2, the system may identify an IP address that corresponds to the residence. Optionally, the system may identify the IP address as being an IP address reflected in records greater than a threshold number of times for a specific time period (e.g., the evening or night time, and optionally at certain days such as work days or weekends). Optionally, this identified IP address may be analyzed to determine its estimated location (e.g., via one or more databases, for example as maintained by an internet service provider). If this estimated location is within a threshold distance of the residence associated with the mobile device, the system may assign the IP address as being associated with the residence.

At block 306, the system determines devices associated with the IP address. The system may analyze the datasets to identify occurrences of the IP address. The identified records may then be associated with the residence. For any record that indicates unique identifiers not known to be associated with the mobile device, the system may assign these unique identifiers as corresponding to devices also associated with the residence. For example, a smart TV may execute an application. This application may trigger a request to a content server (e.g., an ad or bid request, such as to an ad exchange). The request may therefore be reflected in the datasets along with the IP address and a unique identifier, or cookie information, associated with the smart TV.

At block 308, the system generates information associating the mobile device to the determined devices. The system may store information describing the associations. Thus, as new datasets are received the system may identify devices associated with a same residence. Additionally, the system may monitor for occurrences of new devices. It should be appreciated that an IP address associated with a residence may change over time. For example, an internet service provider may update the IP address. Thus, the system may set a particular threshold time period surrounding an IP address. As an example, at blocks 304-306 described above the system can determine devices that are associated with a residence. The system may optionally analyze records within a threshold time period of a record of a mobile device connected to a Wi-Fi network. Since the IP address utilized by the mobile device may change, the system may therefore limit the time period. Example time periods may include a day, a week, a month, a user selectable (e.g., via user input) time period, and so on. Optionally, the time period may be adjusted based on whether the mobile device is stationary or being moved. For example, if the mobile device is stationary for a time period (e.g., based on location information), and the IP address of the mobile device changes, then the new IP address may be associated with the residence.

Figure 4:
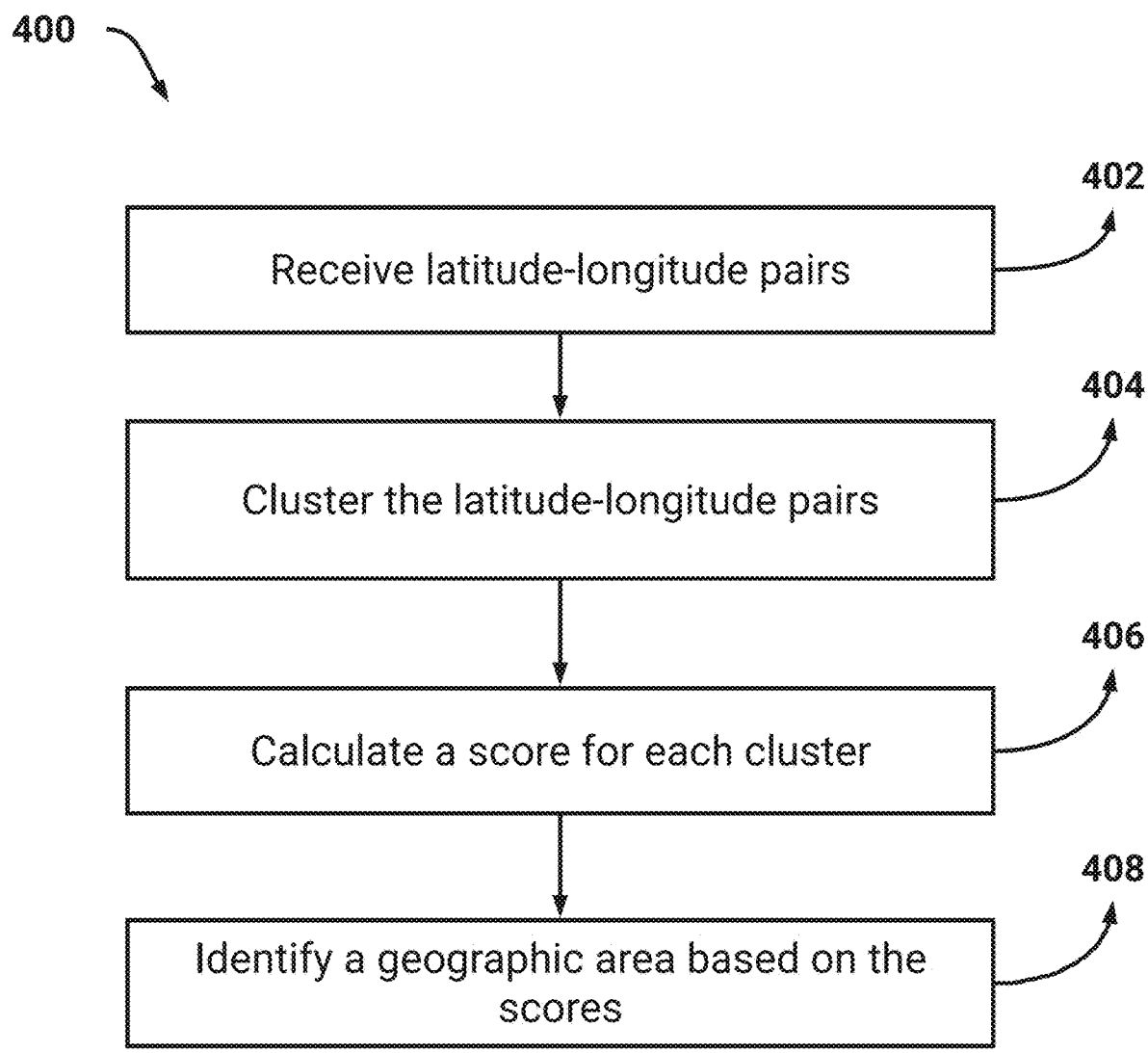
FIG. 4 illustrates a flowchart of an example process 400 for associating a mobile device to a geographic area.

FIG. 4 illustrates a flowchart of an example process 400 for associating a mobile device to a geographic area. For convenience, the process 400 will be described as being performed by a system of one or more computers (e.g., the location association system 100). The process 400 may be utilized, for example, to determine a geographic region which includes a residence of person who owns a mobile device. It should be appreciated that U.S. Pat. No. 8,792,909 describes a scheme to associate a household with a mobile device. For some example countries, the below process may instead be relied upon to associate a geographic area with a mobile device. A geographic area can be any granularity that may include one, two or more than two households, for example, a town, portion of a town, a neighborhood, or a defined rural area.

At block 402, the system receives latitude-longitude pairs corresponding to the mobile device. As described above, the system may access datasets reflecting requests for content items. The requests may include location information, such as GNSS coordinates or latitude-longitude information. Some latitude-longitude pairs may appear millions of time a day in the requests (e.g., ad requests). Such latitude-longitude pairs may be a geographic center of a country or a city that programmers code into and they do not represent a true location of a device. Supervised learning algorithms may therefore be applied to build a global list of latitude-longitude outliers, against which the system may filter out corresponding ad requests, to obtain a filtered time series of latitude-longitude pairs. The list of latitude-longitude outliers may be used to identify erroneous or outlier latitude-longitude pairs received at a later time.

At block 404, the system clusters the latitude-longitude pairs. The system may utilize time series list of latitude-longitude pairs from the most recent day. Optionally, the system may utilize time series list from a week, month, year, and so on. The system may then cluster these latitude-longitude pairs. An example of such clustering is illustrated in FIG. 5, in which each triangle 500 represents a distinct location for a mobile device during a time period (e.g., one day), and four clusters 510, 520, 530, 540, are created around the triangles 500. In general, due to inaccuracies associated with measuring the location of the mobile device, the latitude-longitude pairs and corresponding clusters may represent apparent or plausible locations (e.g., not necessarily accurate locations) visited by the mobile device during the time period. A cluster may correspond to latitude-longitude pairs at or around a residence, those at or around a workplace, those on the road, and many others.

Given any number M of distinct latitude-longitude pairs, the system can partition them into any m number of clusters, for example using the k-nearest neighbors algorithm (KNN).

The system may thus find an optimal, or approximately optimal, partition or set of clusters. For example, the system may determine a minimal number of clusters (e.g., via a bisection algorithm).

At block 406, the system calculates a score for each cluster. The system scores each candidate cluster according to a likelihood that the mobile device is from a residence within the candidate cluster. A score S may be based on features that include the number of requests, the time of each request, and the latitude-longitude; s proximity to a geographic area (e.g., a 'manzana' or other arbitrary geographic region) location. In some examples, the score S for a cluster c may be determined according to $$S(c) = \sum_{i \in \{j: L_j \in c\}} w_1(t_i) w_2(L_i)$$

where $w_1(t_i)$ is a weight for time $t_i$, $w_2(L_i)$ is a weight from location $L_i$, and the summation is taken over all time-location pairs within the cluster c. The weight functions $w_1(t_i)$ and $w_2(L_i)$ may be scaled such that $0 \le w_1(t_i) \le 1$ and $0 \le w_2(L_i) \le 1$.

The system then utilizes general human population behavioral patterns, for example to determine a likelihood that a mobile device bearer is at a residential location. For example, the geographic area for many device bearers corresponds to the location of their mobile device in the evening or at night. Thus, $w_1(t_i)$ may be larger when $t_i$, corresponds to the evening, because the device bearer may be more likely at home during that time. Likewise, $w_2(L_i)$ may be larger when $L_i$ corresponds to a residential location, because the device bearer is more likely at home when the device is in such a location. Further, these weights may be lower when $t_i$ corresponds to the middle of the day, when many people are at work or otherwise away from home, or when $L_i$ corresponds to locations that are not residential (e.g., a highway, a train track, or a body of water, such as an ocean). Additionally, the system may monitor for specific life events. For example, the system may determine that the mobile device is carried to different locations, such as a school, workplace, a store, and so on. The system may then determine that the mobile device returns to a same location afterwards, and/or in the evening. This location may thus represent the residence. With respect to geographic areas, the system may therefore identify the geographic area which includes this residence as associated with the mobile device.

At block 408, the system identifies a geographic area based on the scores. The system may then rank the clusters according to the score S. Each partition may be assigned a probability of containing the residence for the mobile device. The cluster with the highest score, may thus be assigned as being associated with the geographic area.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module," as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop-down menu, a tool bar, a pop-up menu, interactive voice response system, or otherwise.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the inventions described herein can be practiced in many ways. As is also stated herein, it should be noted that the use of particular terminology when describing certain features or aspects of the technology described herein should not be taken to imply that the terminology is being re-defined herein to be restricted to including any specific characteristics of the features or aspects of the technology with which that terminology is associated.

What is claimed is:

1. A computer-implemented method comprising:
obtaining location information for a particular mobile device during a time period;
clustering the location information into a plurality of geographic regions;
accessing information identifying IP addresses used by the particular mobile device while at the geographic regions;
based on the IP addresses, determining likelihoods that a household or workplace associated with the particular mobile device is within respective geographic regions;
assigning the particular mobile device to a particular geographic region associated with a highest determined likelihood, the particular geographic region being determined to include the household or workplace;
subsequent to determining that the particular geographic region includes the household or workplace, accessing a plurality of data sets including IP addresses and corresponding unique identifiers of a plurality of user devices,
wherein a plurality of first IP addresses used by the particular mobile device is identified,
and wherein a particular IP address of the plurality of IP addresses is determined to correspond with the household or workplace, and wherein determining comprises:
estimating locations associated with the plurality of first IP addresses, wherein estimating is based on numerical values included in the first IP addresses,
filtering the plurality of first IP addresses based on respective distances from the associated estimated locations to the particular geographic region, and
assigning the particular IP address of the first IP addresses as corresponding with the household or workplace based on the associated estimated location being within a threshold distance of the particular geographic region;
identifying, in the data sets, one or more user devices which use the particular IP address; and
associating the one or more user devices with the particular geographic region.

2. The computer-implemented method of claim 1, wherein the one or more user devices are determined to use the particular IP address during a time window for which the particular mobile device also uses the particular IP address.

3. The computer-implemented method of claim 1, wherein the one or more user devices comprise non-mobile devices which are not configured to provide location information.

4. The computer-implemented method of claim 3, wherein location information comprises cellular triangulation and/or global navigation satellite system (GNSS) information.

5. The computer-implemented method of claim 3, wherein the non-mobile devices comprise one or more of a smart TV device or a laptop.

6. The computer-implemented method of claim 1, wherein the one or more user devices are determined to connect to a same router as the particular mobile device.

7. The computer-implemented method of claim 1, wherein the data sets indicate timestamps associated with the use of the first IP addresses by the user devices,
and wherein determining that the particular IP address of the plurality of IP addresses corresponds with the household or workplace is further based on the particular IP address being used by the particular mobile device during one or more times associated with increased likelihood of a user being at a household or workplace.

8. The computer-implemented method of claim 1, wherein the particular geographic region is associated with a particular address or a manzana, and wherein the manzana represents a polygonal shape.

9. A system comprising one or more processors and non-transitory computer storage media storing instructions that when executed by the one or more processors, cause the one or more processors to perform operations comprising:
accessing information identifying IP addresses used by a particular mobile device while at a plurality of geographic regions;
based on the IP addresses, determining likelihoods that a household or workplace associated with the particular mobile device is within respective geographic regions;
assigning the particular mobile device to a particular geographic region associated with a highest determined likelihood, the particular geographic region being determined to include the household or workplace;
subsequent to determining that the particular geographic region includes the household or workplace, accessing a plurality of data sets including IP addresses and corresponding unique identifiers of a plurality of user devices, wherein a plurality of first IP addresses used by the particular mobile device is identified, and wherein a particular IP address of the plurality of IP addresses is determined to correspond with the household or workplace, and wherein determining comprises:
estimating locations associated with the plurality of first IP addresses, wherein estimating is based on numerical values included in the first IP addresses,
filtering the plurality of first IP addresses based on respective distances from the associated estimated locations to the particular geographic region, and
assigning the particular IP address of the first IP addresses as corresponding with the household or workplace based on the associated estimated location being within a threshold distance of the particular geographic region;
identifying, in the data sets, one or more user devices which use the particular IP address; and
associating the one or more user devices with the particular geographic region.

10. The system of claim 9, wherein the one or more user devices are determined to use the particular IP address during a time window for which the particular mobile device also uses the particular IP address.

11. The system of claim 9, wherein the one or more user devices are determined to connect to a same router as the particular mobile device.

12. The system of claim 9, wherein the data sets indicate timestamps associated with the use of the first IP addresses by the user devices,
and wherein determining that the particular IP address of the plurality of IP addresses corresponds with the household or workplace is further based on the particular IP address being used by the particular mobile device during one or more times associated with increased likelihood of a user being at a household or workplace.

13. The system of claim 9, wherein the particular geographic region is associated with a particular address or a manzana, and wherein the manzana represents a polygonal shape.

14. Non-transitory computer storage media storing instructions that when executed by a system of one or more processors, cause the one or more processors to perform operations comprising:
- accessing identifying network information associated with a particular mobile device, the identifying network information indicating accesses to one or more networks by the particular mobile device while at a plurality of geographic regions;
- based on the identifying network information, determining likelihoods that a household or workplace associated with the particular mobile device is within respective geographic regions;
- assigning the particular mobile device to a particular geographic region associated with a highest determined likelihood, the particular geographic region being determined to include the household or workplace;
- accessing a plurality of data sets including identifying network information and corresponding unique identifiers of a plurality of user devices, wherein first identifying network information associated with the particular mobile device is identified, and wherein particular identifying network information of the first identifying network information is determined to correspond with the household or workplace, and wherein determining comprises:
  - estimating locations associated with the first identifying network information, wherein estimating is based on numerical values included in the first identifying network information,
  - filtering the first identifying network information based on respective distances from the associated estimated locations to the particular geographic region, and
  - assigning the particular first identifying network as corresponding with the household or workplace based on the associated estimated location being within a threshold distance of the particular geographic region;
- identifying, in the data sets, one or more user devices which are associated with the particular identifying information; and
- associating the one or more user devices with the particular geographic region.

15. The non-transitory computer storage media of claim 14, wherein the particular identifying information comprises a particular IP address.

16. The non-transitory computer storage media of claim 14, wherein the one or more user devices are determined to be associated with the particular identifying information during a time window for which the particular mobile device is also associated with the particular identifying information.

17. The non-transitory computer storage media of claim 14, wherein the particular geographic region is associated with a particular address or a manzana, and wherein the manzana represents a polygonal shape.

* * * * *